No. 621,040. Patented Mar. 14, 1899.
H. H. F. DANGER.
CRACKER MACHINE.
(Application filed June 17, 1898.)
(No Model.) 2 Sheets—Sheet 1.
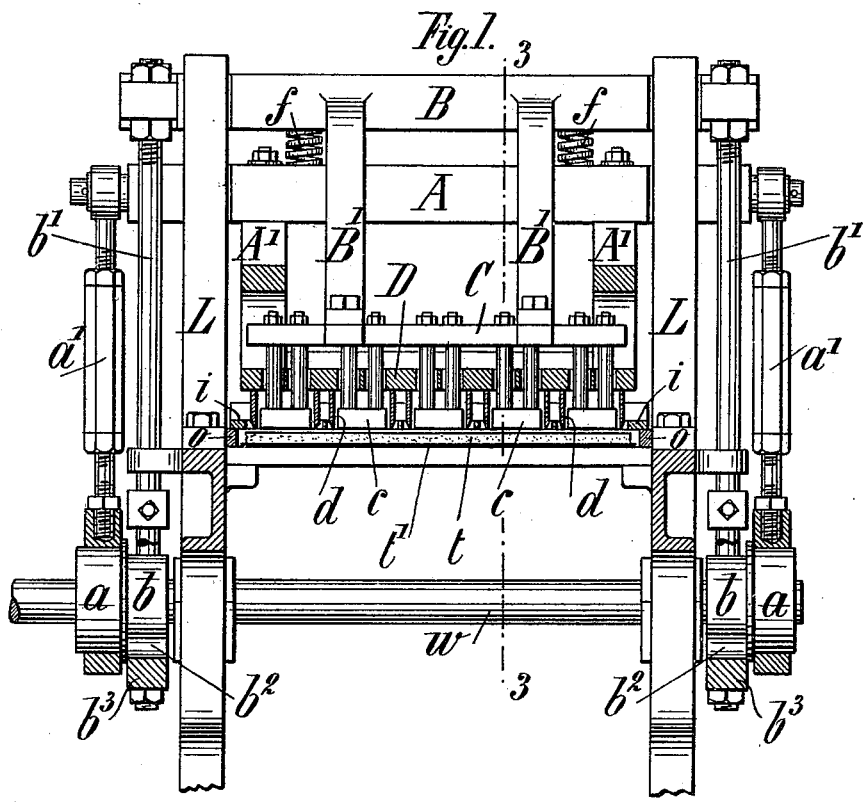
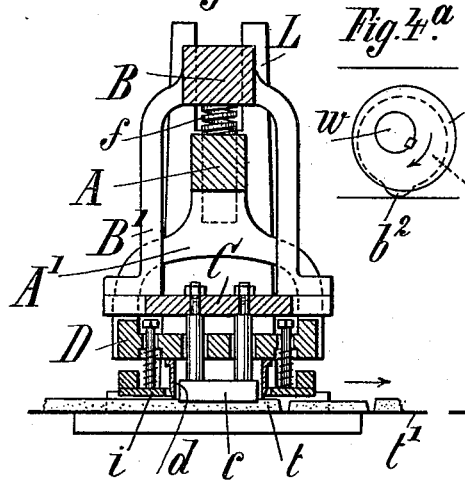
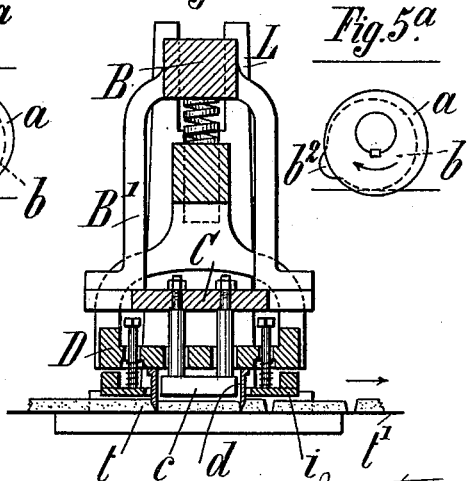
Witnesses.
Inventor,
Hans H. F. Danger,
by ———— Atty

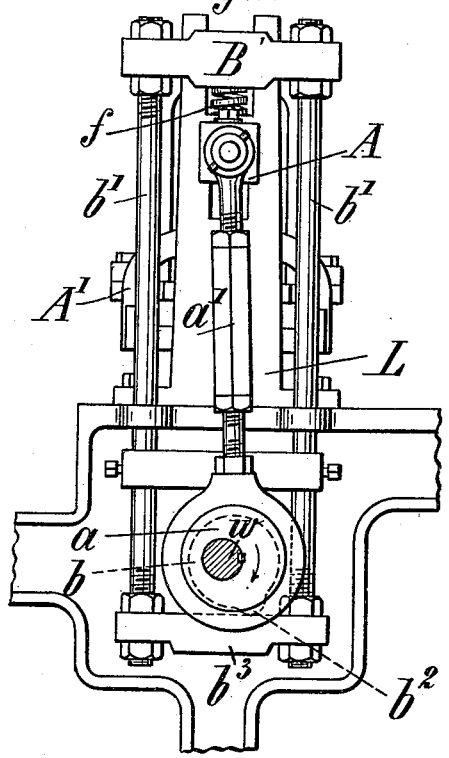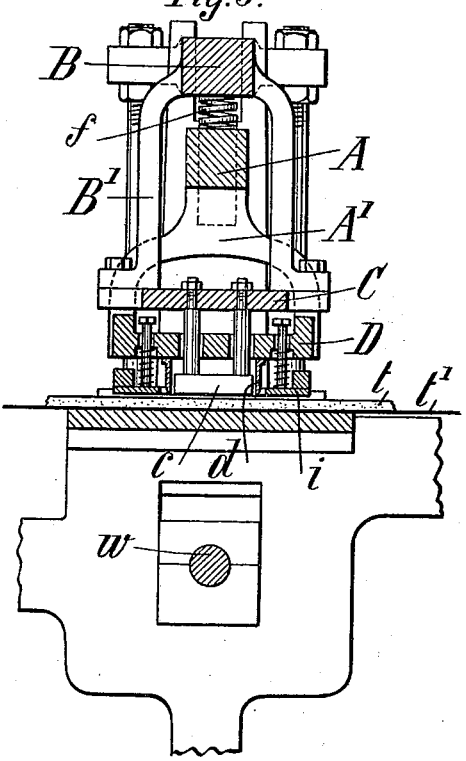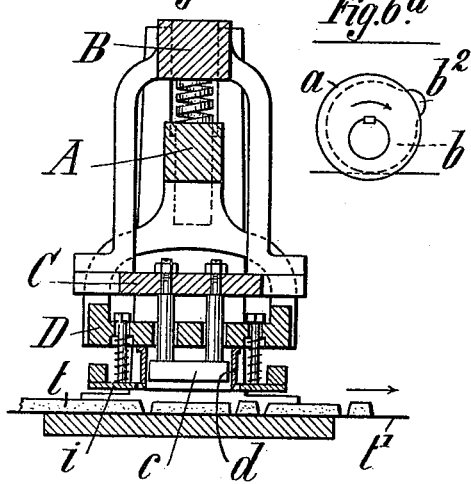

UNITED STATES PATENT OFFICE.

HANS HINRICH FRIEDRICH DANGER, OF HAMBURG, GERMANY.

CRACKER-MACHINE.

SPECIFICATION forming part of Letters Patent No. 621,040, dated March 14, 1899.

Application filed June 17, 1898. Serial No. 683,748. (No model.)

*To all whom it may concern:*

Be it known that I, HANS HINRICH FRIEDRICH DANGER, a subject of the German Emperor, and a resident of Hamburg, in the German Empire, have invented certain new and useful Improvements in Cracker-Machines, of which the following is a specification.

My invention has relation to machines for dividing and stamping dough for the manufacture of crackers, biscuits, cakes, and the like; and it has for its object certain improvements whereby the efficiency of these machines is materially enhanced, especially when used for the stamping and dividing of dough which contains additional adhesives—such as molasses, syrup, and honey, which greatly increases the adhesive properties not readily neutralized or more or less neutralized by the use of dry flour—or in cases where the article made does not admit of the use of a sprinkling of dry flour.

In the accompanying drawings, Figure 1 is a front or end elevation of so much of a machine of the class referred to as will be necessary to a full comprehension of my invention. Fig. 2 is a side elevation, partly in section. Figs. 3, 4, 5, and 6 are fragmentary cross-sectional views illustrative of the relative movements of the stamps and cutters; and Figs. 4$^a$, 5$^a$, and 6$^a$ are side views of the cams and eccentrics, illustrating their relative positions during the movements of the stamps and cutters shown in Figs. 4, 5, and 6, respectively.

The machine comprises as essential features of my invention hollow cutters, stamps contained and having motion in said cutters, and a spring-seated stripper or clearer-plate coöperating with the cutters to clear the same of dough, in combination with mechanism organized to first impart to the stamps their operative or positive movement to leave their impression in the dough and then impart to said stamps their return or negative movement out of or away from the dough and mechanism organized to first impart to the cutters their operative or positive movement to divide the dough, said movement taking place, however, after the stamps have begun their negative movement, and to then impart to said cutters their negative movement or movements out of the dough, so that said cutters act as clearers for the stamps to clear them of the strip or sheet of dough adhering thereto. During this negative or non-operative movement of the cutters the clearer-plate clears the same of the strip or sheet of dough adhering thereto, as hereinafter more fully referred to.

The machine in practice comprises, of course, also feeding mechanism organized to intermittingly feed the dough carrier or apron to the stamps and cutters over a suitable bed or table arranged below the same. These feeding appliances are, however, of common use in this class of machines and form no part of my invention and need, therefore, not be particularly described or illustrated.

From each side of a suitable frame provided with bearings for the eccentric and cam-shaft $w$ rises a vertical standard L, each provided with a vertical guide-slot for the ends of two superposed cross-heads A and B. The cross-head A is connected at each end by means of rods $a'$, adjustable as to length to straps, in which work eccentrics $a$, secured to shaft $w$. The cross-head B is connected at each end by rods $b'$ to yokes $b^3$ in contact with cams $b$, also secured to shaft $w$, and in order that the contact between the cams and their yokes and the eccentrics and their straps may be maintained at all times, and thereby insure the correct relative movements of the cross-heads A and B, I interpose between the latter quite powerful springs $f$. It is obvious that by the means of said springs the wear of the parts is taken up, thus effectually guarding against irregular motion of the cross-heads A and B without interfering with their movements independently of each other.

From the lower cross-head A depend stirrups or hangers A', to which is secured the cutter-head D, and to the latter the hollow cutters $d$, which may be of any desired configuration, according to the contour it is desired to give to the piece of dough cut out thereby.

From the upper cross-head B depend stirrups or hangers B', to which is secured the stamp-carrier plate C, the stamps $c$ being secured to the carrier by means of threaded posts or bolts and nuts, as shown, said stamps being contained in the cutters, so as to have free motion therein, and may be, in fact preferably are, substantially of the same cross-sectional area as the like internal area of the cutters $d$. Upon cleats $o$ is seated a clearer-plate $i$, which has openings in which the cutters $d$ work freely, and, as shown in Fig. 1, said cleats or seats are so arranged as to support the clearer-plate $i$ slightly above the surface of the sheet of dough $t$ on apron $t'$, which is being intermittingly fed over the bed or table.

The plate $i$ has headed posts or bolts that project through openings in the cutter-head D, said posts or bolts being of such length as that said plate will not be lifted by said cutter-head when it is moving away from the sheet or strip of dough. On said posts are coiled springs, whose ends abut, respectively, against the plate and against the cutter-head, so that whatever be the position of the latter the clearer-plate $i$ will always be acted upon by said springs.

The eccentrics $a$ and cams $b$, provided with the cam lip or nose $b^2$, are so arranged on shaft $w$ that in the normal non-operative position of the cutters and stamps the impression-face of the latter will be flush with the cutting-face of the cutters and with the under face of the clearer-plate $i$, a little above the sheet of dough $t'$, as shown in Fig. 3. As the shaft $w$ revolves the upper cross-head B and stamps $c$ are moved down by the action of cams $b$ on their yokes $b^3$, Fig. 4$^a$, thereby causing the said stamps to make an impression in the dough, Fig. 4, during which movement of the upper cross-head B the springs $f$ are compressed. Immediately after the stamps have reached the limit of their positive or impression movement the nose $b^2$ on cams $b$ moves out of engagement with the yokes $b^3$, leaving springs $f$ free to lift cross-head B and stamps. As the latter are moving upward the eccentrics $a$, Fig. 5$^a$, acting on their straps, cause the lower cross-head A, together with the cutter-head and cutters, to move down, meeting the sheet of dough adhering to the stamps, clearing the latter thereof, and continuing their positive or cutting movement to divide the stamped sheet of dough, Fig. 5, after which said eccentrics raise the cross-head A. As the latter is about to reach or has reached the limit of its upward motion the cams $b$ act upon their yokes and commence to move the cross-head B and stamps $c$ downward until the parts are again in the position Fig. 3, when by a further rotation of shaft $w$ the nose $b^2$ on said cams $b$ will again impinge upon the yokes $b^3$ to move the cross-head B and stamp $c$ down again, and so on. As the cutters $d$ rise and carry the dough into contact with the clearer plate $i$ the latter rises also to a slight extent or until the stress of its springs is sufficiently increased to force said plate back to its seat with more or less violence, thereby jarring the same and causing the dough adhering thereto to drop back on the apron $t$, at which moment said apron is fed forward a sufficient distance to bring an undivided and unstamped portion of the sheet of dough $t$ under the stamping and dividing appliances.

I am aware that in machines such as herein referred to the stamps have been arranged to work within the cutters, and I do not desire to claim this arrangement broadly.

Having thus described my invention, what I claim as new therein, and desire to secure by Letters Patent, is—

1. In a machine such as described, a hollow cutter, a stamp contained and having motion therein, mechanism for imparting to the stamp its positive or operative movement and then its return or negative movement, mechanism for imparting similar movements to the cutter, organized to impart the positive or operative movement to said cutter after the stamp has begun its negative movement, and a clearer for clearing the cutter of dough, for the purpose set forth.

2. In a machine such as described, a hollow cutter, a stamp contained and having motion therein, mechanism for imparting to the stamp its positive or operative movement and then its return or negative movement, mechanism for imparting similar movements to the cutter organized to impart to said cutter its positive movement after the stamp has begun its negative movement, and a spring-seated clearer-plate for clearing the cutter of dough, for the purpose set forth.

3. In a machine such as described, a hollow cutter, a stamp contained and having motion therein, an upper and lower cross-head to which said stamp and cutter are secured and springs interposed between said cross-heads; in combination with a revoluble shaft, cams and eccentrics thereon acting upon yokes and straps connected with said upper and lower cross-heads respectively, said eccentrics arranged relatively to said cams to move the lower cross-head down after the upper cross-head has begun its upward movement, and a clearer-plate for clearing the cutter of dough, for the purpose set forth.

4. In a machine such as described, a hollow cutter, a stamp contained and having motion therein, an upper and lower cross-head to which said stamp and cutter are secured, and springs interposed between said cross-heads; in combination with a revoluble shaft, cams and eccentrics thereon acting upon yokes and straps connected with said upper and lower cross-heads respectively, said eccentrics arranged relatively to said cams to move the lower cross-head down after the upper cross-head has begun its upward movement, and a spring-seated clearer-plate held with its under face slightly above the sheet of dough, for clearing the cutters, said plate having vertical motion independently of the stamps and cutters, for the purpose set forth.

HANS HINRICH FRIEDRICH DANGER.

Witnesses:
MAX KAEMPFF,
WILHELM SÄHN.